United States Patent
Cordon

(10) Patent No.: US 11,659,091 B2
(45) Date of Patent: *May 23, 2023

(54) SYSTEM AND METHOD FOR MAXIMIZING CAPACITY OF AN AGENT IN A CONTACT CENTER BY OMNI SESSION HANDLING

(71) Applicant: inContact INC., Sandy, UT (US)

(72) Inventor: Alfred Shane Cordon, South Weber, UT (US)

(73) Assignee: INCONTACT INC., Sandy, UT (US)

( * ) Notice: Subject to any disclaimer, the term of this patent is extended or adjusted under 35 U.S.C. 154(b) by 72 days.

This patent is subject to a terminal disclaimer.

(21) Appl. No.: 17/324,460

(22) Filed: May 19, 2021

(65) Prior Publication Data
US 2021/0274045 A1 Sep. 2, 2021

Related U.S. Application Data

(63) Continuation of application No. 16/846,443, filed on Apr. 13, 2020, now Pat. No. 11,057,524, which is a continuation of application No. 16/532,501, filed on Aug. 6, 2019, now Pat. No. 10,666,806.

(51) Int. Cl.
*H04M 3/523* (2006.01)
*G06N 20/00* (2019.01)

(52) U.S. Cl.
CPC .......... *H04M 3/5233* (2013.01); *G06N 20/00* (2019.01); *H04M 2203/402* (2013.01)

(58) Field of Classification Search
None
See application file for complete search history.

(56) References Cited

U.S. PATENT DOCUMENTS

| | | | | |
|---|---|---|---|---|
| 5,311,574 | A * | 5/1994 | Livanos | H04Q 11/0428 379/266.03 |
| 7,039,166 | B1 * | 5/2006 | Peterson | H04M 3/493 379/93.08 |
| 2002/0131399 | A1 * | 9/2002 | Philonenko | H04M 3/5232 370/411 |
| 2015/0350429 | A1 * | 12/2015 | Kumar | G10L 15/22 379/88.01 |
| 2016/0182721 | A1 * | 6/2016 | Khalatian | H04L 41/5064 379/265.09 |

* cited by examiner

*Primary Examiner* — Quynh H Nguyen
(74) *Attorney, Agent, or Firm* — Soroker-Agmon-Nordman; Sharone Godesh; Daniel Schatz

(57) ABSTRACT

A computerized-method for operating an Omni Session Handling (OSH) engine for proactive OSH to determine that an outreach is required, according to one or more predefined requirements, to maximize capacity of an agent in a contact center by omni session handling, is provided herein. The computerized-method may retrieve one or more interactions from a Customer-Relations-Management database based on a requirement for an outreach to be stored in a queue of proactive contacts. The computer-implemented method may further allocate a queue of one or more interactions to an agent or to a team of agents and then present the agent with a digital preview of an interaction from the queue of one or more interactions for consideration via a display unit, while the agent is handling one or more interactions. The computer-implemented method may further receive from the agent a decision upon review of the presented digital preview of the interaction.

18 Claims, 3 Drawing Sheets

SYSTEM AND METHOD FOR MAXIMIZING CAPACITY OF AN AGENT IN A CONTACT CENTER BY OMNI SESSION HANDLING

RELATED APPLICATIONS

This application claims priority as a continuation from application Ser. No. 16/648,443 dated Apr. 13, 2020 which is a continuation of application Ser. No. 16/532/501, now U.S. Pat. No. 10,666,806 dated Aug. 8, 2019, the disclosure of which is incorporated herein by reference.

TECHNICAL FIELD

The present disclosure relates to the field of systems that manage the routing of contacts in a contact center and systems that control the agent handling of interactions in an Omni Session Handling (OSH) environment and allow preview of information related to a potential contact before handling the interaction.

BACKGROUND

Many organizations and businesses provide service to their customers via a contact center. In the contact center, agents equipped with a computer that is linked to the organization's internal and external network handle a large volume of inbound and outbound interactions with customers. The agents may work locally in the contact center or remotely via connection to the contact center systems. Some contact centers are operating as an in-house department and some contact centers are hired by the organizations and being operated by a third-party agency for different reasons such as lowering organizations expenses on customer service.

Nowadays, with the available variety of communication channels, many contact centers foster these varied types of communication channels to provide service to customers such as telephone calls, faxes, emails, chat, social media, co-browsing, SMS (text) messages and MMS messages. The services may be provided via inbound interactions or outbound interactions.

Outbound interactions are commonly initiated by the organization for billing, collections, reservations management, pre-admission and the like. In some industries such as the healthcare industry or the hospitality industry, the customer is being contacted before arriving at the premises. For example, in the healthcare industry, a patient may be reached out by an agent in the contact center in a process of pre-admission to a medical procedure. In another example, in the hospitality industry, a guest may be reached out by an agent in the contact center before arriving to a reserved vacation at the hotel or resort. Yet, in other industries, interactions are performed proactively for customers retention purposes.

To indicate to the agent in the contact center that a customer should be approached, the agent is presented with a digital preview of the contact which includes all the necessary details regarding the required outreach and pre-determined pending media desired for the interaction. For example, a customer may be 30 days late in making payment to the organization and may be identified by the Customer Relationship Management (CRM) system as needing to be contacted in order to bring the account current. An agent in the contact center may be presented with a digital preview of the contact and the required payment along with a preferred media which the agent should use to contact the customer.

Currently systems tie the digital preview of the contact directly to the pre-determined pending media that is desired for the interaction with the customer. Thus, agents are refrained from providing service to other customers while they review the information related to the potential contact. For example, in case the pre-determined pending media desired for the interaction is a voice call, the agent is reserved for the pending voice call while the preview is taking place, which is preventing the agent from being available for other interactions via other communication channels. However, in most cases, many of these preview interactions end with the agent determining that the interaction should be handled later and not immediately.

With many contact centers engaging in multiple session handling, i.e. Omni Session Handling (OSH), this dedicated experience of the agent to the digital preview interaction, may prevent higher priority work from being routed to the agent while the agent is previewing a possible interaction and also may withhold maximizing agent's capacity and may interfere with established service-level agreement (SLA) goals. Therefore, the review period of the interaction should not be treated the same as a live interaction with the customer and the agent should be available for other interactions during the digital preview.

Currently, there is no technical solution which allows an agent to preview contacts and groom the agent's personal preview contacts queue while working on other active interactions calls (i.e. inbound or outbound) or any other active interactions via other communication channels.

With increasing regulation related to customer service, more companies are relying on digital preview to deliver a more targeted calling effort. Therefore, there is a need for a technological solution that will allow a digital preview of a contact to be delivered concurrently with other active interactions such that the agent will be available for handling higher priority voice calls or other interactions.

Furthermore, there is a need for a technological solution that will not restrict the agent to the preview contact until the agent has chosen to interact with the preview contact or even until the contact responds, thus having the contact center efficiently utilizing the agent's capacity.

SUMMARY

There is thus provided, a computer-based technology improvement for maximizing capacity of an agent in a contact center by omni session handling. The computerized-method comprising: retrieving one or more interactions from a Customer Relations Management (CRM) database based on a requirement for an outreach to be stored in a queue of proactive contacts; allocating a queue of one or more interactions out of the retrieved one or more interactions to an agent or to a team of agents; presenting the agent or an agent in the team of agents with a digital preview of an interaction from the queue of one or more interactions for consideration via a display unit, while the agent is handling one or more interactions; and receiving from the agent a decision upon review of the presented digital preview of the interaction. At least one contact is associate to the interactions.

Furthermore, in accordance with some embodiments of the present invention, the allocating is based on at least one of: predetermined set of rules, machine learning, artificial intelligence, or any combination thereof.

Furthermore, in accordance with some embodiments of the present invention, the allocating of the queue of one or more interactions is based on correlation between preconfigured skills and preferences of the agent or the team of agents and one or more predefined criteria which are required to handle the interaction.

Furthermore, in accordance with some embodiments of the present invention, the computerized-method further comprising, receiving one or more notes from the agent to record: (i) one or more decision reasoning; or (ii) review process; or (iii) observations, or any combination thereof.

Furthermore, in accordance with some embodiments of the present invention, the received decision is to accept the interaction.

Furthermore, in accordance with some embodiments of the present invention, the computerized-method further comprising receiving from the agent: (i) a communication channel type to perform the accepted interaction; and (ii) a priority relative to other pending interactions to determine a priority in a personal queue of the agent or in a queue of a team of agents.

Furthermore, in accordance with some embodiments of the present invention, the communication channel type is selected from: an outbound phone call, a window for composing an email, a chat, an SMS text message, a prepackaged fax document, a social messaging or any other media content or connection type.

Furthermore, in accordance with some embodiments of the present invention, the computerized-method further comprising retrieving an interaction from the personal queue of the agent or in a queue of a team of agents and checking the amount of concurrent sessions via the received communication channel type.

Furthermore, in accordance with some embodiments of the present invention, when the amount of concurrent sessions via the received communication channel type is less than a predefined amount of concurrent sessions, the computerized-method further comprising conducting an attempt to establish a session with a contact that is associated to the accepted interaction and the agent or an agent in the team of agents, via the received communication channel type and according to the received priority.

Furthermore, in accordance with some embodiments of the present invention, when the contact responds via a communication channel type other than the received communication channel type, the computerized-method further comprising enabling the session via the other communication channel type.

Furthermore, in accordance with some embodiments of the present invention, when the amount of concurrent sessions via the received communication channel type is less than a predefined amount of concurrent sessions, the computerized-method further comprising conducting an attempt to establish a session with a contact that is associated to the accepted interaction and the agent or an agent in the team of agents, via the received communication channel type and according to the received priority.

Furthermore, in accordance with some embodiments of the present invention, when the amount of concurrent sessions via the received communication channel type is equal or more than a predefined amount of concurrent sessions, the computerized-method further comprising delaying the interaction for a specified amount of time.

Furthermore, in accordance with some embodiments of the present invention, when the contact responds via a communication channel type other than the received communication channel type, the computerized-method further comprising enabling the session via the other communication channel type.

Furthermore, in accordance with some embodiments of the present invention, the computerized-method further comprising engaging the agent with the contact only when a response is received from the contact.

Furthermore, in accordance with some embodiments of the present invention, the received decision is to reject the interaction.

Furthermore, in accordance with some embodiments of the present invention, the computerized-method further comprising receiving a request from the agent to transfer the interaction to a queue of interactions of another agent or to a queue of another team of agents or a queue of a predefined criteria or any other queue of interactions.

Furthermore, in accordance with some embodiments of the present invention, the computerized-method further comprising receiving a request from the agent to reschedule the rejected interaction for a specified amount of time or until a specified date and time and storing the interaction in the database.

Furthermore, in accordance with some embodiments of the present invention, the computerized-method further comprising receiving a finalize request from the agent which will prevent further actions.

Furthermore, in accordance with some embodiments of the present invention, the computerized-method further comprising conducting an attempt to establish a session with a contact that is associated to the rescheduled rejected interaction at the specified date and time, and the agent or an agent in the team of agents.

Furthermore, in accordance with some embodiments of the present invention, when the attempt is unsuccessful at establishing a session with the contact that is associated to the interaction, the computerized-method further comprising, receiving from the agent a request to: (i) reschedule the interaction or to finalize which will prevent further actions; (ii) alter the communication channel type; (iii) queue the interaction in the personal queue of the agent or in the queue of the team of agents.

According to some embodiments, when the attempt is unsuccessful at establishing a session with the contact that is associated to the interaction, the computerized-method further comprising, receiving from the agent one or more notes related to the unsuccessful attempt.

There is further provided, a computerized-system for maximizing capacity of an agent in a contact center by omni session handling. The computerized-system comprising: a display unit; and a processor configured to: (i) retrieve one or more interactions from a Customer Relations Management (CRM) database based on a requirement for an outreach to be stored in a queue of proactive contacts; (ii) allocate a queue of one or more interactions out of the retrieved one or more interactions to an agent or to a team of agents; (iii) present the agent or an agent in the team of agents with a digital preview of an interaction from the queue of one or more interactions for consideration via a display unit, while the agent is handling one or more interactions; and (iv) receive from the agent a decision upon review of the presented digital preview of the interaction. wherein at least one contact is associate to the interactions; and a memory to store the queue of proactive contacts and the queue of one or more interactions.

BRIEF DESCRIPTION OF THE DRAWINGS

In order for the present disclosure, to be better understood and for its practical applications to be appreciated, the FIG. 1 is a high-level flow diagram illustrating operations performed by an Omni Session Handling (OSH) engine, in accordance with some embodiments of the present disclosure.

Figure 1:
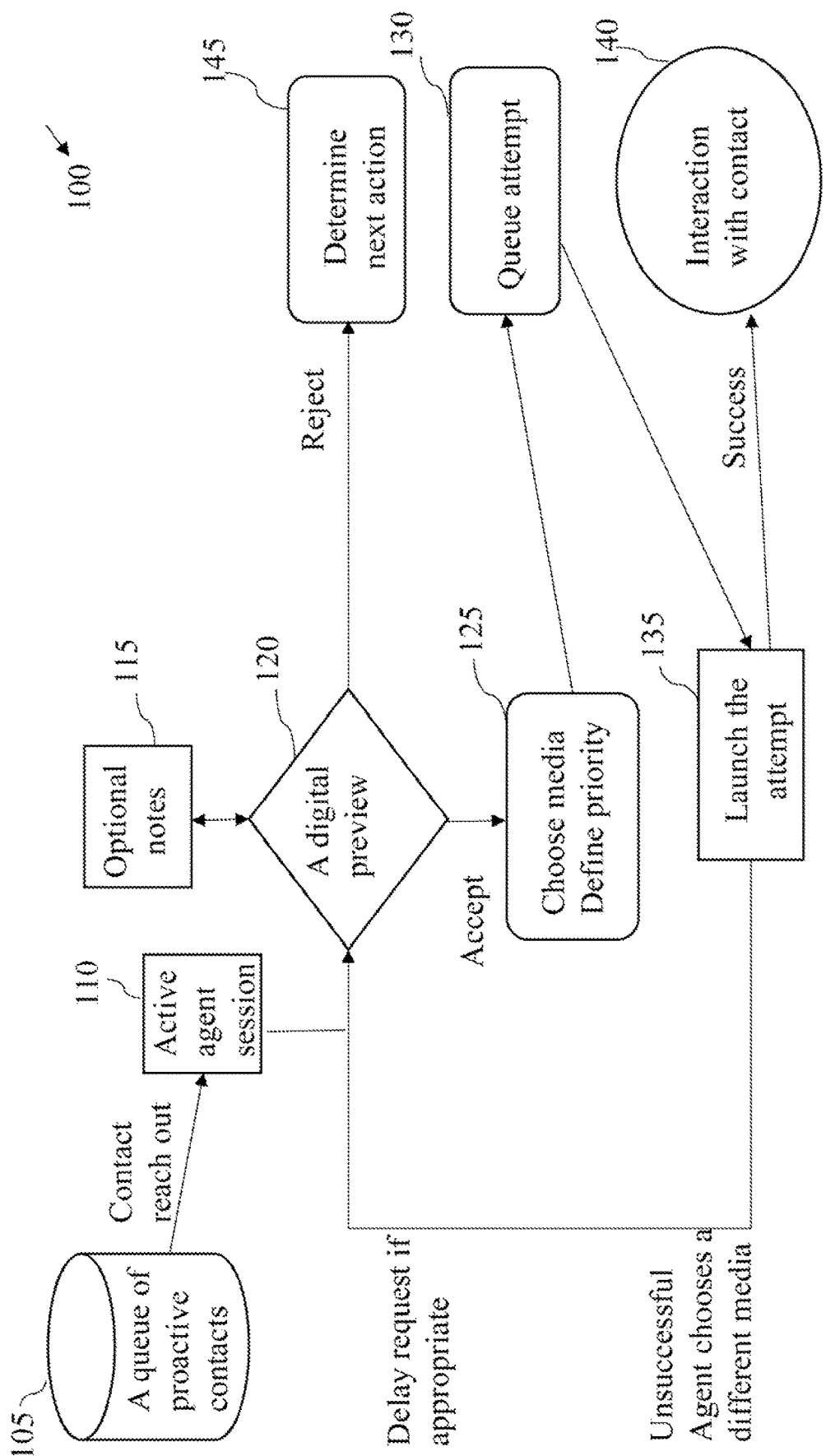

DETAILED DESCRIPTION in the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term "Contact Relationship Management (CRM)" as used herein refers to software systems that manage the interactions with the organization's contacts.

The term "Short Message Service (SMS)" as used herein refers to a text messaging service provided by most telephones, internet and mobile phones.

The term "Multimedia Messaging Service (MMS)" as used herein refers to a way to send messages that include multimedia content to and from a mobile phone.

The term "preview queue" as used herein refers to records reviewed and pending delivery to the agent.

The term "Proactive OSH (Omni-Session Handling)" or "OSH" as used herein refers to user-initiated communication with a contact using a number of different communication channels such as voice, text, email, social media, etc.

The term "digital preview" as used herein refers to a digital prelude to the contact to be routed to the agent and allow for the same handling options as other proposed digital interactions.

The term "contact" as used herein refers to an interaction with a consumer of the contact center services. Typically references a specific individual and includes a reference to the means of contacting the individual (i.e., phone number, email address, chat, etc.).

The term "preview contact" as used herein refers to a proposed interaction that allows the agent to review the purpose of the proposed interaction and review referenced information to determine the best way to proceed. For example, a digital preview of an interaction is presented related to a proposed call with a consumer to pre-admit the contact to the hospital. The agent is able to review the record which is associated with the CRM and determine if the enrollment is still needed or if the interaction can be dismissed or rescheduled for another time.

The term "inbound" as used herein refers to interactions that are flowing in to the contact center.

The term "outbound" as used herein refers to interactions that are initiated by the contact center and are reaching out to the desired entity.

The term"priority routing" as used herein refers to the practice of defining the relative priority of all potential interactions and routing those with the highest priority value first.

The term "media" as used herein refers to the channel of communication inclusive of all current and potential communication channels, currently comprising voice, text, chat, messaging, fax and email.

The term "push model" as used herein refers to a model that determines the timing of a contact delivery and the appropriate agent to present the contact to for consideration i.e., digital preview. The determination may be based on various factors such as availability of the agent, capacity of the agent, required agent skills and desired agent capabilities. This technology exists as part of Automatic Contact Distributor (ACD) routing engine.

The term "pull model" as used herein refers to a model which allows an agent to review the list of available interactions for consideration and select those that the agent wants to review further i.e., digital preview.

The term "preview experience" as used herein refers to a situation where an agent reviews a proposed interaction and based on the presented information decides if the interaction should be made, when the interaction should be made and which communication channel to use to make the contact.

The term "agent's personal preview queue" as used herein refers to a queue which is comprised of records of interactions i.e., contact. Based on user preferences, the records are "pushed" to the agent's personal preview queue for review or the agent "pulls" the desired interactions records for consideration.

The term "queue of proactive contacts" as used herein refers to a queue that is managed by a list handling module. The queue of proactive contacts is comprised of selected contact records which are passed to the agent's personal preview queue.

The present disclosure provides a computerized-method and a computerized-system which is a computer-based technology improvement of handling of components related to contacts i.e., interactions in a contact center. According to some embodiments of the present disclosure, the improvement of handling components related to interactions, i.e., a digital preview of a contact as well as concurrently handling multiple sessions by an agent in a contact center, may be achieved by separating the preview experience which is the digital portion of the interaction i.e., digital preview of the contact, from the routed interactions with the contacts, i.e., sessions handling of inbound and outbound interactions, to the agent.

Moreover, by separating the preview experience which is the digital portion of the interaction i.e., preview contact, from the routed interactions with the contacts, the agent may prioritize the presented records while handling other live interactions, possibly reviewing and disposing of several potential contacts i.e., interactions until one interaction is identified as needing an outreach.

According to some embodiments, the computerized-method and computerized-system may improve utilization of the agent's capacity by limiting the actual period of time that the agent is considered unavailable for handling other interactions. Moreover, the computerized-method and computerized-system may improve the ability to route the most important work to the agents and may leverage the available time of the agent to manage the queue of agent selected engagements i.e., agent's personal preview queue.

According to some embodiments, the computerized-method and computerized-system may allow an agent to groom the agent's personal preview queue while working on other active calls (i.e., inbound or outbound) by reviewing the preview contact and deciding upon review of the presented digital preview of the interaction the next course of action, i.e., to accept the interaction or to reject it, regardless of the preconfigured communication type in the preview contacts. When accepting the interaction, the priority may also be specified by the agent as part of the grooming of the personal preview queue.

FIG. 1 is a high-level flow diagram illustrating operations performed by an Omni Session Handling (OSH) engine, in accordance with some embodiments of the present disclosure.

According to some embodiments, an engine such as OSH engine 100 for proactive OSH may implement a method for maximizing the capacity of an agent in a contact center by retrieving one or more contacts, by a processor, from a Customer Relations Management (CRM) database based on a requirement for an outreach. The requirement for an outreach might be related to a predefined amount of time before the current date or may be related to a specified time since the contact accomplished the last order. A requirement for an outreach may be for example, a scheduled follow up to a previous interaction, such as a web inquiry or a previous interaction with the organization through its website, store front or contact center. Another example for a requirement for an outreach may be for example, a notification of promotions or special offers of interest. Alternatively, a requirement for an outreach may be based on a demographic profile match.

According to some embodiments, OSH engine 100 may determine that an outreach to the entity is desirable for some purpose. OSH engine 100 may perform the determination based on a predetermined set of rules, machine learning, artificial intelligence, or any combination thereof and later may use the processor to allocate a queue of one or more interactions out of the retrieved one or more interactions to an agent or to a team of agents and utilize the memory to store it in the allocated queue of one or more interactions such as queue of proactive contacts 105.

According to some embodiments, OSH engine 100 may allocate the queue of one or more interactions based on correlation between preconfigured skills and preferences of the agent or the team of agents and one or more predefined criteria which are required to handle the interaction.

According to some embodiments, an agent in the contact center or an agent in a team of agents in the contact center, may receive from OSH engine 100, by the processor, a request for a contact reach out from the queue of proactive contacts 105, while the agent is having an active agent session 110. Meaning, this is done independently of, and in addition to, all other interactions or processes that the agent is already performing.

According to some embodiments, OSH engine 100 may concurrently deliver a preview contact with other active contacts thus, leaving the agent available for high priority interactions (via any media) during the preview experience. That is, OSH engine 100 may present the agent or the agent in the team of agents with a digital preview of a contact 120 from the queue of one or more interactions such as the queue of proactive contacts 105 for consideration via a display unit, i.e., preview experience, while the agent is handling one or more interactions. Having OSH engine 100 enable these concurrent interactions, allows the contact center to utilize agent resources more efficiently by not restricting the agent until the agent has chosen to interact with the previewed contact. An entity is associated with the contact, the entity may be a potential customer, customer, business, congress, etc.

According to some embodiments, the OSH engine 100 may enable the digital preview of a contact 120 i.e., the preview experience, to stay concurrent with other work that the agent has, allowing the agent to review the information in the digital preview of a contact 120, in-between other interactions. The review of information in the digital preview by the agent, improves the utilization of the agent's capacity because it is limiting the actual period of time that the agent is considered unavailable for handling other interactions.

According to some embodiments, after the agent has reviewed the digital preview and once the agent has decided that an interaction is needed, the agent may choose to use another media besides a phone call to proactively interact with the contact that is in the digital preview of contact 120, for example via SMS, Instagram, Facebook (FB) Messenger, Email, MMS messages and the like. By doing so, OSH engine 100 eliminates idle time that is associated with preview contacts that do not require an interaction. Alternatively, according to some embodiments, OSH engine 100 may choose the media i.e., communication type for the agent.

According to some embodiments, the agent may access other information related to the contact to assess context, timing of an outreach, priority, etc. When the agent decides to accept the interaction, the agent may define a communication channel type and a priority 125. The customer choice of communication channel type is known and stored in the CRM, and the preference of the customer may be used to determine the communication channel preferred by the agent. The agent may further determine based on interaction history and intuition which communication channel type will likely bring a successful interaction. Alternatively, according to some embodiments, the system, such as OSH engine 100 following a defined business logic, may choose the next communication channel type to use.

According to some embodiments, once an interaction is identified as needing an outreach, the live interaction may be queued for delivery and may be properly aligned based on the relative priority. This is also an opportunity for the agent to identify the appropriate media i.e., communication channel, to use for the interaction and it allows agents to leverage all communication channels available to them and align with stated customer's preferences.

According to some embodiments, the agent may define via an input device (i) a communication type to perform the accepted interaction such as SMS, Instagram, Facebook (FB) Messenger, Email, and the like and (ii) a priority of the interaction relative to other pending interactions, i.e., immediate or delayed. Alternatively, the agent may define via the input device a priority in the agent's personal preview queue of interactions or in the queue of the team of agents.

In a non-limiting example, when the agent decides to accept the interaction and chooses a voice call as a communication channel, the interaction may then become a queued voice-call and it is executed when priority dictates.

According to some embodiments, upon review of the digital preview of the interaction, the agent may provide via an input device, a decision to OSH engine 100. The received decision may be to accept the interaction or to reject it.

According to some embodiments, OSH engine 100 may receive from the agent one or more notes 115 via an input device, to record: (i) one or more decision reasoning; or (ii) review process; or (iii) observations, or any combination thereof while reviewing the digital preview of the interaction. The agent may want to record the reasons for taking the action. For example, after the agent reviews the interaction history and sees that the customer called in yesterday and made a payment, this would have resulted in being informed of the current promotions and the agent notes that another call today would be redundant and captures the reasons in the notes for future reference.

According to some embodiments, when the agent has accepted the request for reach out, OSH engine 100 may queue the interaction for delivery. The delivery of the interaction may be an outbound phone call, a window for composing an email, chat, or SMS text, a pre-packaged fax document, social messaging or other media content or connection type.

According to some embodiments, OSH engine 100 may perform a queue attempt 130 for the agent by retrieving an interaction from the agent's personal preview queue of the agent or from the queue of the team of agents and may check the amount of concurrent sessions that the agent is conducting, via the received communication channel type. When the amount of concurrent sessions via the received communication channel type is less than a predefined amount of concurrent sessions, OSH engine 100 may further launch the attempt 135 to establish a session with a contact that is associated to the accepted interaction and the agent or an agent in the team of agents, via the received communication channel type and according to the received priority.

Alternatively, according to some embodiments, when the amount of concurrent sessions via the received communication channel type is equal or more than a predefined amount of concurrent sessions, OSH engine 100 may delay the interaction for a specified amount of time.

According to some embodiments, depending on the media that is configured in the requested interaction, the agent may not engage with the contact until a response is received from the entity being contacted. For example, if the chosen media has been configured to be an SMS text message, the agent may be presented with the interaction only once the customer responds to the text message that the OSH engine 100 has sent. Another media that the OSH engine 100 may initiate a reach out, but the agent may be engaged only once the contact has responded may be: chat, voice, or other media types.

According to some embodiments, once the interaction with the contact has been successfully established 140, the agent may also react to the customer response that arrived using a different media type than the one that has been chosen to initiate the interaction with and the OSH engine may add it to the amount of concurrent sessions that the agent is conducting via the media type. For example, a customer may reply via SMS ("I can't talk right now. What's up?") to the voice call request, and the agent may then continue the engagement via SMS media. The OSH engine 100 may consider SMS media in the total amount of concurrent sessions that the agent is conducting via SMS media.

According to some embodiments, if the contact attempt has been unsuccessful at establishing the interaction (e.g., ringing phone, but with no answer), the agent may choose via the input device to: (i) conclude the attempt by finalizing or rescheduling; (ii) another media type (if available) and queue another attempt. For example, a voice call attempt was not answered and agent desires to send an SMS message. Moreover, additional notes 115 may be added by the agent.

According to some embodiments, OSH engine 100 may delay the contact attempt, depending on the system and agent load limits. This may prevent the agent from receiving an excessive number of interactions to manage in each communication channel type. User preferences determine the capacity limits of each agent to handle multiple interactions in each communication channel type and OSH engine 100 may calculate that the agent is operating at capacity at this particular moment. Based on these capacity limits, additional interaction opportunities in a communication channel type may be delayed or reassigned to honor these limits. For example, Tim, an agent in a call center has demonstrated that he can handle 3 chats and one voice call at the same time—additionally he can actively review up to 2 preview interactions and one email for reply. Once Tim has reached these capacity limits, no more contacts will be offered to him until he completes the ones assigned.

According to some embodiments, when OSH engine 100 receives from the agent a decision to reject the interaction, the rejection may be: (i) a request from the agent to transfer the interaction to a queue of interactions of another agent or to a queue of another team of agents or a queue of a predefined criteria or any other queue of interactions; (ii) to reschedule the rejected interaction for a specified amount of time or until a specified date and time and storing the interaction in the database; or (iii) a finalize request from the agent which will prevent further actions.

According to some embodiments, OSH engine 100 may receive from the agent a request to transfer the interaction to a queue of interactions of another agent or to a queue of another team of agents or a queue of a predefined criteria or any other queue of interactions.

Figure 2:
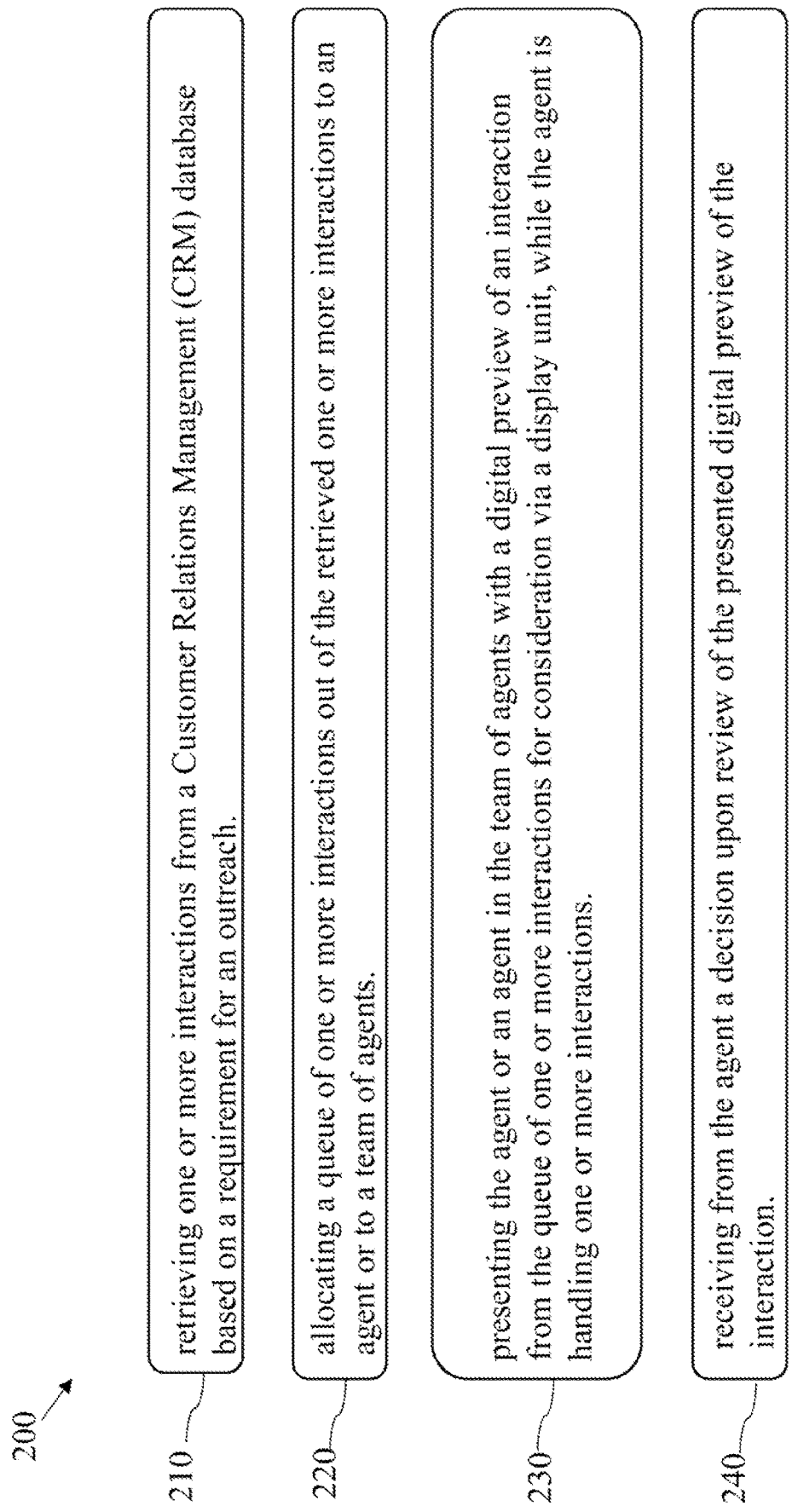
FIG. 2 is flow-chart depicting a computerized-method for maximizing capacity of an agent in a contact center by Omni Session Handling, in accordance with some embodiments of the present disclosure.

FIG. 2 is flow-chart depicting a computerized-method for maximizing capacity of an agent in a contact center by the computerized-method 200, in accordance with some embodiments of the present disclosure.

According to some embodiments, the computerized-method 200 (OSH engine 100 in FIG. 1) for proactive OSH may implement a method for maximizing capacity of an agent in a contact center. Operation 210 may comprise retrieving one or more interactions from a Customer Relations Management (CRM) database based on a requirement for an outreach. In a non-limiting example, the retrieved interaction may be an outreach to a customer that is more than 30 days late in making a payment and the retrieved interaction has been identified by the CRM of the organization as needing to be performed in order to bring the account current. The retrieved interactions may be stored in a queue of proactive contacts, shown in FIG. 1 as 105 and in FIG. 3 as 345.

According to some embodiments, operation 220 may comprise allocating a queue of one or more interactions out of the retrieved one or more interactions to an agent or to a team of agents. In a non-limiting example, the retrieved interaction may be allocated to a queue of an agent or to a queue of a team of agents. Alternatively, a digital preview from the queue of proactive contacts may be presented to the agent to be later on stored on the agent's personal preview queue.

According to some embodiments, operation 230 may comprise presenting the agent or an agent in the team of agents with a digital preview of an interaction from the queue of one or more interactions for consideration via a display unit, while the agent is handling one or more interactions. Thus, separating the digital portion of the interaction i.e., preview contact, from the routed interactions with the contacts. In a non-limiting example, the retrieved interaction may be contacting a customer that is more than 30 days late in making a payment. The information may be presented to the agent as a digital preview while the agent is handling other live sessions such as a phone call, Email, chat or the like. So, while the agent is waiting on hold for the customer on the phone call to find a credit card, the agent is able to review the information regarding the retrieved interaction. The agent may also review notes that documented previous attempts that were made and may see two unsuccessfully attempted that were made on the customer's home phone. The agent may notice that the customer does not like being called at work and has a mobile phone and a preapproval to contact on the mobile using text messaging.

According to some embodiments, operation 240 may comprise receiving from the agent a decision upon review of the presented digital preview of the interaction. The decision may be to accept the interaction or to reject the interaction. When the agent accepts the interaction, the agent may specify the media for the session and the priority of the interaction in comparison to other interactions in the agent's personal queue. In a non-limiting example, when the agent decides to accept the interaction the agent may decide to communicate with the customer via SMS test message during office hours. Accordingly, the agent may prioritize the interaction in the personal preview queue for delivery. When the time for delivery of the interaction arrives, the computerized-method 200 performs queue attempt 130 in FIG. 1 to the interaction. The agent may send a text message to the customer about bringing the account current.

Figure 3:
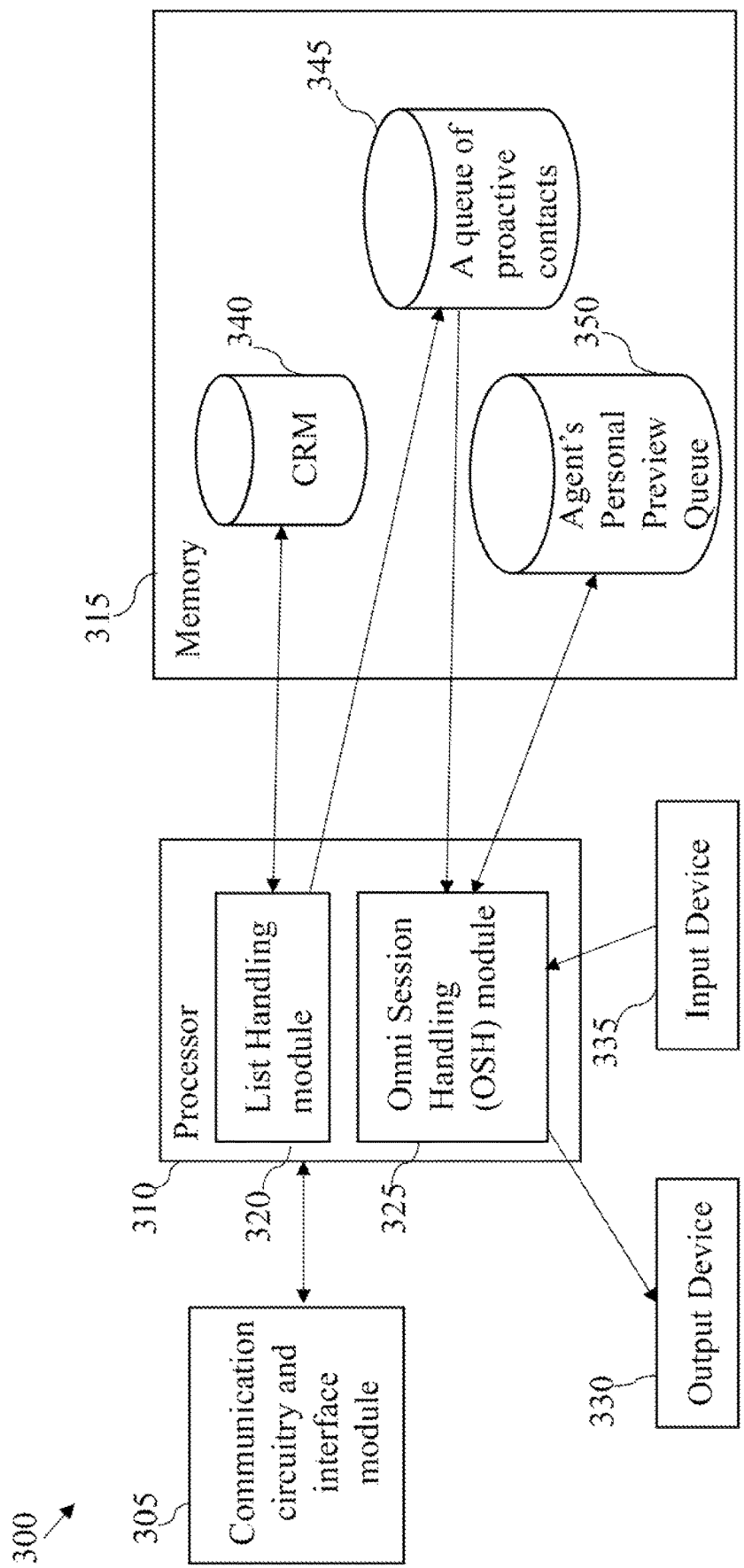
FIG. 3 schematically illustrates a system for OSH, in accordance with some embodiments of the present disclosure.

FIG. 3 schematically illustrates a system for OSH 300, in accordance with some embodiments of the present disclosure.

According to some embodiments, the computerized-system for OSH 300 for proactive OSH may include a processor such as processor 310, a memory such as memory 315, an output device 330, an input device 335 and a communication circuitry and interface module 305 for wired and/or wireless communication with any other computerized device over a communication network. The processor, e.g., processor 310 may include one or more processing units, i.e., of one or more computers. The processor may be configured to operate in accordance with programmed instructions which are stored in the memory. Furthermore, the processor may be capable of executing the machine learning algorithm.

According to some embodiments, the processor e.g., processor 310 may communicate with an output device, e.g., output device 330. For example, the output device may include a computer monitor or screen. The processor 310 may communicate with a screen of the output device 330 to display, for example, a digital preview. In another example, the output device may include a printer, display panel, speaker, or another device capable of producing visible, audible, or tactile output.

According to some embodiments, the processor e.g., processor 310 may communicate with an input device, e.g., input device 335. For example, the input device may include one or more of a keyboard, keypad, or pointing device for enabling a user to inputting data or instructions for operation of the processor.

According to some embodiments, the memory 315 may include one or more volatile or nonvolatile memory devices. The memory 315 may be utilized to store, for example, programmed instructions for operation of the processor 310, data or parameters for use by the processor 310 during operation, or results of the operation of the processor 310. For example, the memory 315 may store interactions retrieved from the CRM in the queue of proactive contacts 345 (also shown as 105 in FIG. 1).

According to some embodiments, the processor e.g., processor 310 may communicate with the memory 315. The memory may include one or more volatile or nonvolatile memory devices. The memory may be utilized to store, for example, programmed instructions for operation of the processor, data or parameters for use by the processor during operation, or results of operation of the processor. The memory may include databases CRM 340, a queue of proactive contacts 345 and agent's personal preview queue 350 stored thereon.

According to some embodiments, list handling module 320 in the system for OSH 300 may use the processor 310 and the memory 315 to retrieve one or more interactions from a Customer Relations Management (CRM) database such as database 340, to store the retrieved one or more interactions in a queue of proactive contacts such as the queue of proactive contacts 345 (also shown as 105 in FIG. 1). The processor 310 and the memory 315 may use Omni Session Handling module 325 to allocate a queue of one or more interactions out of the retrieved one or more interactions to an agent or to a team of agents to be stored in an agent's personal preview queue such as the agent's personal preview queue 350.

The memory may include a computer readable medium for storing program instructions for operation of the processor. In this example, the programmed instructions may take the form of OSH engine, the form of list handling application/module 320 which is running on the processor 310.

According to some embodiments, the processor 310 and the memory 315 may be further used to present the agent or an agent in the team of agents with a digital preview of an interaction from the queue of one or more interactions for consideration via a display unit i.e., an output device 330, while the agent is handling one or more interactions.

According to some embodiments of the disclosure, information which is related to customers, i.e., contacts may be stored on CRM database such as CRM 340 and it may be used by list handling module 320 to retrieve interactions based on a requirement for an outreach. The retrieved interactions may be stored on a queue of proactive contacts, such as queue of proactive contacts 345.

According to some embodiments of the disclosure, Omni Sessions Handling (OSH) module 325 (also shown in FIG.

1 as 100 and in FIG. 2 as 200) may allocate a queue of one or more interactions out of the retrieved one or more interactions to an agent or to a team of agents and store it in the agent's personal preview queue 350.

According to some embodiments, the computerized-system for OSH 300 may provide a preview experience to the agent by presenting the agent or the agent in the team of agents, a digital preview of an interaction 120 in FIG. 1 from the queue of one or more interactions i.e., the queue of proactive contacts 345 (also shown as 105 in FIG. 1) for consideration via a display unit, such as output device 330, while the agent is handling one or more interactions.

According to some embodiments, the computerized-system for OSH 300 may receive from an agent via input device 335 a decision upon review of the presented digital preview of the interaction. When the decision of the agent is to accept the interaction, the processor 310 may use OSH module 325 to queue the interaction in the agent's personal preview queue 350. Thus, allowing the agent to groom its own personal preview queue 350 and perform all the operations of OSH module 100 detailed with respect to FIG. 1 and of computerized-method 200 detailed with respect to FIG. 2.

According to some embodiments, the processor 310 may use OSH module 325 (also shown in FIG. 1 as 100 and in FIG. 2 as 200) to implement machine learning, a predetermined set of rules, machine learning, artificial intelligence, or any combination thereof.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed is:

1. A computerized-method for operating an Omni Session Handling (OSH) engine for proactive OSH to determine that an outreach is required, according to one or more predefined requirements, to maximize capacity of an agent in a contact center, the computerized-method comprising:
    retrieving two or more proactive interactions from a Customer Relations Management (CRM) database based on the one or more predefined requirements for an outreach to be stored in a queue of proactive contacts;
    allocating a queue of two or more interactions from the queue of proactive contacts to an agent or to a team of agents;
    presenting the agent or an agent in the team of agents with a digital preview of two or more proactive interactions from the queue of two or more proactive interactions for consideration, via a display unit, while the agent is handling one or more interactions; and
    receiving from the agent a decision upon review of the presented digital preview of the two or more interactions,
    wherein the received decision is to accept two or more proactive interactions from the presented digital preview of the two or more interactions or to reject the two or more proactive interactions from the presented digital preview of the two or more interactions, and
    wherein at least one contact is associated to the proactive interactions.

2. The computerized-method of claim 1, wherein the allocating is based on at least one of: predetermined set of rules, machine learning, artificial intelligence, or any combination thereof.

3. The computerized-method of claim 1, wherein the allocating of the queue of two or more interactions is based on correlation between preconfigured skills and preferences of the agent or the team of agents and one or more predefined criteria which are required to handle an interaction.

4. The computerized-method of claim 1, wherein the computerized-method further comprising, receiving one or more notes from the agent to record: (i) one or more decision reasoning; or (ii) review process; or (iii) observations, or any combination thereof.

5. The computerized-method of claim 1, wherein the computerized-method further comprising receiving from the agent: (i) a communication channel type to perform the accepted interaction; and (ii) a priority relative to other pending interactions to determine a priority in a personal queue of the agent or in a queue of a team of agents.

6. The computerized-method of claim 5, wherein the communication channel type is selected from: an outbound phone call, a window for composing an email, a chat, an SMS text message, a pre-packaged fax document, a social messaging or any other media content or connection type.

7. The computerized-method of claim 5, wherein the computerized-method further comprising retrieving an interaction from the personal queue of the agent or in a queue of a team of agents and checking the amount of concurrent sessions via the received communication channel type.

8. The computerized-method of claim 7, wherein when the amount of concurrent sessions via the received communication channel type is less than a predefined amount of concurrent sessions, the computerized-method further comprising conducting an attempt to establish a session with a contact that is associated to an accepted proactive interaction and the agent or an agent in the team of agents, via the received communication channel type and according to the received priority.

9. The computerized-method of claim 8, wherein when the amount of concurrent sessions via the received communication channel type is equal or more than a predefined amount of concurrent sessions, the computerized-method further comprising delaying the accepted proactive interaction for a specified amount of time.

10. The computerized-method of claim 9, wherein when the contact responds via a communication channel type other than the received communication channel type, the computerized-method further comprising enabling the session via the other communication channel type.

11. The computerized-method of claim 9, the computerized-method further comprising engaging the agent with the contact only when a response is received from the contact.

12. The computerized-method of claim 1, wherein the computerized-method further comprising receiving a request from the agent to transfer the one or more proactive interactions from the presented digital preview of the two or more interactions to a queue of interactions of another agent or to a queue of another team of agents or a queue of a predefined criteria or any other queue of interactions.

13. The computerized-method of claim 1, wherein the computerized-method further comprising receiving a request from the agent to reschedule rejected one or more proactive interactions from the presented digital preview of the two or more interactions for a specified amount of time or until a specified date and time and storing the rejected one or more proactive interactions from the presented digital preview of the two or more interactions in the database.

14. The computerized-method of claim 1, wherein the computerized-method further comprising receiving a finalize request from the agent which will prevent further actions.

15. The computerized-method of claim 13, wherein the computerized-method further comprising conducting an attempt to establish a session with a contact that is associated to the rescheduled rejected one or more proactive interactions from the presented digital preview of the two or more interactions at the specified date and time, and the agent or an agent in the team of agents.

16. The computerized-method of claim 15, when the attempt is unsuccessful at establishing a session with the contact that is associated to the interaction, the computerized-method further comprising, receiving from the agent a request to: (i) reschedule the interaction or to finalize which will prevent further actions; (ii) alter the communication channel type; (iii) queue the interaction in the personal queue of the agent or in the queue of the team of agents.

17. The computerized-method of claim 15, when the attempt is unsuccessful at establishing a session with the contact that is associated to the interaction, the computerized-method further comprising, receiving from the agent one or more notes related to the unsuccessful attempt.

18. A computerized-system for operating an Omni Session Handling (OSH) engine for proactive OSH to determine that an outreach is required, according to one or more predefined requirements, to maximize capacity of an agent in a contact center, the computerized-system comprising:
   a display unit; and
   a processor configured to operate an Omni Session Handling (OSH) engine for proactive OSH to determine that an outreach is required, according to one or more predefined requirements;
   said OSH engine is configured to:
      retrieve two or more proactive interactions from a Customer Relations Management (CRM) database based on the one or more predefined requirements for an outreach to be stored in a queue of proactive contacts;
      allocate a queue of two or more interactions from the queue of proactive contacts to an agent or to a team of agents;
      present the agent or an agent in the team of agents with a digital preview of two or more proactive interactions from the queue of two or more proactive interactions for consideration via a display unit, while the agent is handling one or more interactions;
      receive from the agent a decision upon review of the presented digital preview of the two or more interactions,
      wherein the received decision is to accept two or more proactive interactions from the presented digital preview of the two or more interactions or to reject the two or more proactive interactions from the presented digital preview of the two or more interactions, and
      wherein at least one contact is associated to the interactions; and
   a memory to store the queue of proactive contacts and the queue of two or more interactions.

* * * * *